(No Model.)
T. GAUNT.
EVAPORATING APPARATUS.
No. 434,441. Patented Aug. 19, 1890.
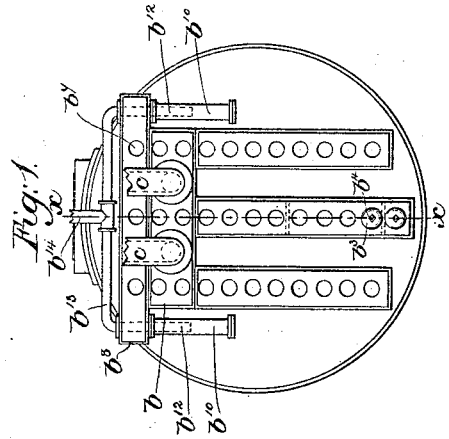
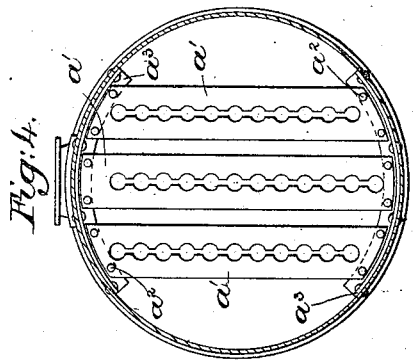
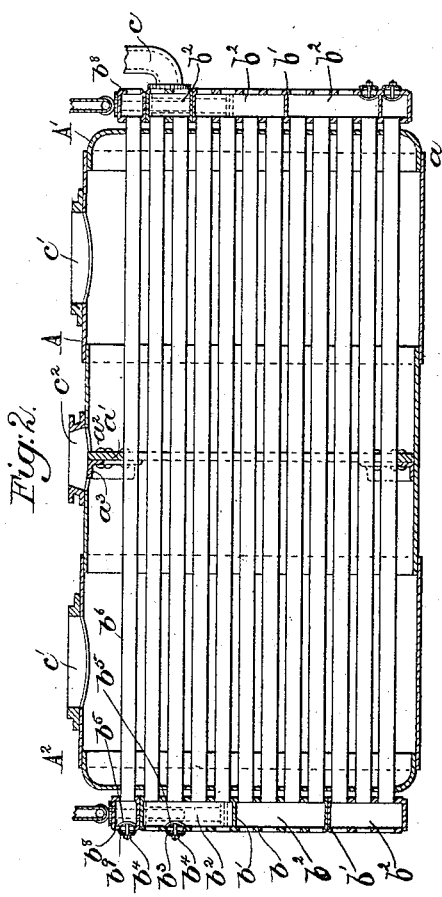
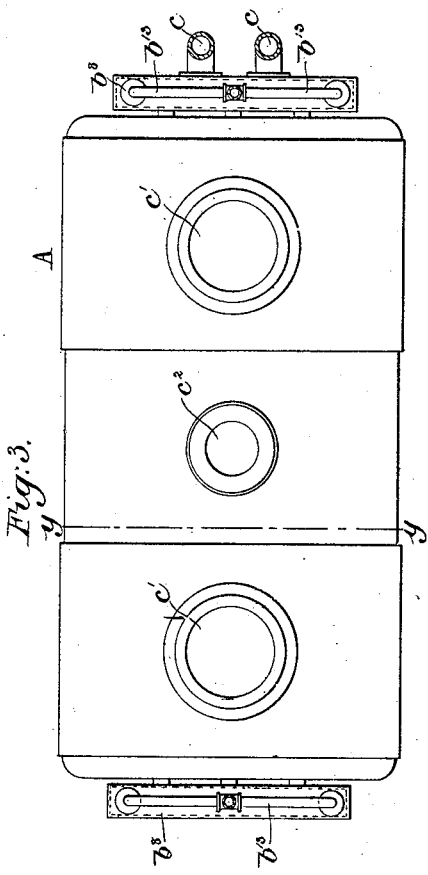
Witnesses:
Edgar A. Goddin
Frederick L. Emery
Inventor:
Thomas Gaunt,
by Crosby & Gregory
Attys.

UNITED STATES PATENT OFFICE.

THOMAS GAUNT, OF BROOKLYN, NEW YORK.

EVAPORATING APPARATUS.

SPECIFICATION forming part of Letters Patent No. 434,441, dated August 19, 1890.

Application filed March 29, 1890. Serial No. 345,849. (No model.)

*To all whom it may concern:*

Be it known that I, THOMAS GAUNT, of Brooklyn, county of Kings, State of New York, have invented an Improvement in Evaporating Apparatus, of which the following description, in connection with the accompanying drawings, is a specification, like letters on the drawings representing like parts.

This invention relates to evaporating apparatus substantially such as shown and described in United States Patent No. 409,572, granted to me August 20, 1889.

My present invention has for its object to simplify, cheapen, and improve the construction of evaporators, whereby an apparatus of maximum capacity may be made so as to occupy but a substantially small amount of space, and whereby the component parts of the evaporator may be readily accessible for inspection, repairs, and other purposes.

In accordance with my present invention the evaporating-surface, preferably tubes or pipes arranged in vertical rows, are extended through a case or shell, which may be cylindrical, square, or of other shape, and the ends of the said tubes or pipes are extended beyond the heads of the inclosing-case and have fitted upon them independent castings or boxes provided with one or more openings in line with the tubes or pipes, the said openings being provided with removable covers, whereby access may be had to the interior of the said tubes.

The inclosing case or shell may be provided with suitable man-holes, through which access may be had to the interior of the said case or shell.

My invention in an evaporating apparatus therefore consists in the combination, with an inclosing-case provided with heads and a hollow evaporating-surface extended through and beyond said heads and preferably secured therein steam and vacuum tight, of one or more castings or boxes fitted upon the projecting ends of the hollow evaporating-surface and provided with an opening substantially in line with the hollow evaporating-surface, and a removable cover for said opening, substantially as will be described.

Other features of my invention will be pointed out in the claims at the end of this specification.

Figure 1 is an end elevation of one form of evaporating apparatus embodying my invention; Fig. 2, a longitudinal section in the line $x\ x$, Fig. 1; Fig. 3, a top or plan view of the apparatus shown in Fig. 2; and Fig. 4, a transverse central section in the line $y\ y$, Fig. 3.

My improved apparatus consists of an enclosing-case A, herein shown as cylindrical in shape and provided with heads $A'\ A^2$, after the manner of an ordinary tubular boiler, the said case containing within it a hollow evaporating-surface, preferably tubes or pipes $a$. The tubes or pipes $a$ are preferably arranged in vertical rows, as shown in Fig. 1, and each row of tubes or pipes is extended through the heads $A'\ A^2$ and are supported within the shell or case A, substantially near the longitudinal center of the same, by plates or bars $a'$, herein shown as secured by bolts $a^2$ to angle-irons $a^3$, riveted or otherwise secured to the shell A. Each row of tubes $a$ is extended beyond the heads $A'\ A^2$, and the tubes or pipes of each row are preferably expanded or otherwise secured vacuum-tight in the said heads, and each row of tubes has fitted upon its extended ends at each end or side of the case or shell one or more independent castings or boxes $b$, which may be divided by partitions $b'$ to form chambers $b^2$. The box or casting $b$ is fitted upon the projecting ends of the said tubes, and the said tubes are preferably expanded steam-tight within the said box or casting, and preferably opposite each tube or pipe the outer wall or side of each casting is provided with an opening of substantially the same size as the tube or pipe, which opening is normally closed by a cover $b^3$, herein shown as secured steam-tight over its opening by means of a bolt $b^4$ and crow-foot or bar $b^5$.

As herein represented, each vertical row of tubes $a$ has co-operating with it a liquid feeder or supply, herein shown as a pipe $b^6$, provided at its upper end with a longitudinal slot $b^7$, the said tubes being extended beyond the heads $A'\ A^2$ of the case or shell, and preferably expanded into the box or casting $b^8$ at each end of the apparatus, the said boxes being preferably also provided opposite each feed-tube $b^6$ with an opening having a removable cover $b^3$, secured thereto by a bolt $b^4$ and crow-foot $b^5$. The liquid-feed box $b^8$ at each end of the apparatus is herein shown as provided with vertical cylinders $b^{10}$ or reservoirs near its opposite ends, into which may be extended vertical legs $b^{12}$ of a branch pipe $b^{13}$, the said branch pipes at opposite ends of the shell or case being connected by a pipe $b^{14}$, which communicates with the liquid-supply. (Not herein shown.) The vertical legs $b^{12}$ of the branch pipe $b^{13}$ are extended down, as herein shown, into the vertical cylinders $b^{10}$ substantially to near the bottom of the same, so as to form a liquid seal, whereby the different degrees of vacuum between two or more evaporators may be maintained, when two or more of the said evaporators are arranged in gradation and connected together for multiple effect, substantially as shown and described in United States Patent No. 416,456, granted to me.

As herein shown, the two uppermost tubes or pipes of each vertical row of pipes are expanded into a common or single casting or box $b$, as clearly shown in Figs. 1 and 2, and the castings or boxes co-operating with the remaining tubes of the different vertical rows of tubes are shown as subdivided by the walls $b'$ into the chambers $b^2$.

The dividing-walls $b'$ in each casting or box are preferably arranged so as to form a continuous passage from the uppermost chamber $b^2$ through the tubes to the lowermost or last chamber $b^2$, whereby the heating medium may be continuously circulated through each vertical row of tubes when the evaporation takes place on the outside of the tube, as represented by the apparatus herein shown.

The heating medium may be supplied to the uppermost chamber $b^2$ at one end of the case or shell by the supply-pipes $c$, there being two such pipes herein shown, which may be connected with the steam-boiler or other source of heat, or which may be connected with the case or shell A of another evaporator, when two or more evaporators are connected together to form a multiple effect.

The case or shell A is provided, as herein shown, with two man-holes $c'$, by means of which access may be had to the interior of the case or shell to clean or otherwise repair the interior of the evaporator. The case or shell A is also provided, as herein shown, with a vapor-outlet $c^2$, by which the steam or vapors may pass off to constitute the heating agent of a second evaporator, or may pass off to a condenser, if desired.

By means of the removable covers $b^3$ for the openings in the castings or boxes $b$ access may be readily had to the interior of the evaporating-tubes for inspection or for purpose of repairs, or to enable the same to be cleaned, for it will readily be seen that the said cover opposite the ends of a tube or pipe may be removed and a swab, scraper, or other instrument may be run through the tube from one end to the other, thereby enabling the evaporating-tubes to be quickly cleaned on their inner side without disturbing the remaining parts of the apparatus. By providing the removable covers preferably opposite each individual tube or pipe any defect or fault in the apparatus may be readily noted and located.

I have herein described the evaporator as consisting of tubes or pipes arranged in vertical rows and having co-operating with them a liquid-supply constructed to deliver the liquid to be evaporated over and upon the outside surface of the said tubes.

While I prefer this construction of apparatus, I do not desire to limit my invention in this respect, as the castings or boxes provided with the removable cover or covers may be used equally well with an evaporating apparatus in which the liquid is supplied to the interior of the tubes and the heating agent is supplied to the outside of the same, for in this case it will be seen that by means of the removable covers each tube may be readily cleaned on its inner side and inspected at any time without any considerable trouble. The reservoirs $b^{10}$ also serve as receiving-chambers for sediment.

By means of the independent castings $b$ the cost of construction is very materially lessened, and the heads $A'$ $A^2$ may be made of steel or wrought-iron, or of brass, copper, alumina, or similar metal when the apparatus is used for evaporating substances which would attack cast-iron. The heads $A'$ $A^2$ are made of copper or like material unaffected by the liquid being treated—such, for instance, as oak-bark extract.

I claim—

1. In an evaporating apparatus, the combination, with an inclosing-case provided with heads and a hollow evaporating-surface extended through and beyond said heads and secured therein steam and vacuum tight, of one or more independent castings or boxes having their rear sides fitted upon the projecting ends of the hollow evaporating-surface and provided with an opening in their front sides substantially in line with the hollow evaporating-surface, and a removable cover for said opening, substantially as described.

2. In an evaporating apparatus, the combination, with an inclosing-case provided with heads and an evaporating-surface composed of tubes or pipes extended through and beyond the said heads and secured therein steam and vacuum tight, of one or more independent castings or boxes fitted upon the projecting ends of the said tubes or pipes and provided with one or more removable covers, substantially as described.

3. In an evaporating apparatus, the combination, with an inclosing-case provided with heads and an evaporating-surface composed of tubes or pipes extended through the said heads and secured therein steam and vacuum tight, and a support for said tubes within the said case or shell, of one or more independent castings or boxes fitted upon the projecting ends of the said tubes or pipes, and provided with one or more removable covers, substantially as described.

4. In an evaporating apparatus, the combination, with an inclosing-case provided with heads, and an evaporating-surface composed of tubes or pipes extended through and beyond the said heads, of one or more independent castings or boxes supported at each end of the inclosing-case by the extended ends of the said tubes or pipes and made steam and vacuum tight and provided with one or more removable covers, substantially as described.

5. In an evaporating apparatus, the combination, with an inclosing-case provided with heads, an evaporating-surface composed of tubes or pipes, and a liquid-feeder for said evaporating-surface, the said evaporating-tubes and liquid-feeder being extended through and beyond the heads of the inclosing-case, of one or more independent castings or boxes supported at each end of the case by the extended ends of the evaporating-tubes, and an independent casting secured to the extended ends of the liquid-feeder and having a removable cover, and being provided with a reservoir to form a liquid seal with the liquid-supply pipe and to receive sediment, substantially as described.

6. In an evaporating apparatus, the combination, with an inclosing-case provided with heads, an evaporating-surface, and a liquid-feeder for said evaporating-surface extended through and beyond the said heads, of an independent casting or box secured to the extended ends of the liquid-feeder, and having a removable cover and being provided with a reservoir, as $b^{10}$, to receive sediment in the liquor, substantially as described.

In testimony whereof I have signed my name to this specification in the presence of two subscribing witnesses.

THOMAS GAUNT.

Witnesses:
JAS. H. CHURCHILL,
EMMA J. BENNETT.